(12) United States Patent
Coffey et al.

(10) Patent No.: US 10,111,238 B2
(45) Date of Patent: Oct. 23, 2018

(54) WIRELESS COMMUNICATION METHOD AND DEVICE

(71) Applicant: REALTEK SEMICONDUCTOR CORPORATION, Hsinchu (TW)

(72) Inventors: John Timothy Coffey, San Francisco, CA (US); Der-Zheng Liu, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 101 days.

(21) Appl. No.: 15/397,440

(22) Filed: Jan. 3, 2017

(65) Prior Publication Data

US 2017/0127429 A1 May 4, 2017

Related U.S. Application Data

(62) Division of application No. 14/296,065, filed on Jun. 4, 2014, now Pat. No. 9,578,657.

(60) Provisional application No. 61/978,644, filed on Apr. 11, 2014.

(51) Int. Cl.

| H04L 1/00 | (2006.01) |
|---|---|
| H04L 1/18 | (2006.01) |
| H04L 29/06 | (2006.01) |
| H04W 72/08 | (2009.01) |
| H04W 74/08 | (2009.01) |
| H04W 84/12 | (2009.01) |

(52) U.S. Cl.
CPC ......... *H04W 72/085* (2013.01); *H04L 1/0021* (2013.01); *H04L 1/1867* (2013.01); *H04L 69/22* (2013.01); *H04W 74/0808* (2013.01); *H04W 74/0816* (2013.01); *H04W 84/12* (2013.01)

(58) Field of Classification Search
CPC .................................................... H04W 84/12
USPC ......................................................... 370/338
See application file for complete search history.

(56) References Cited

U.S. PATENT DOCUMENTS

| 2004/0150760 | A1 | 8/2004 | Chung |
| 2005/0152313 | A1 | 7/2005 | Cave et al. |
| 2005/0277423 | A1 | 12/2005 | Sandhu et al. |
| 2007/0060155 | A1 | 3/2007 | Kahana et al. |
| 2007/0074090 | A1 | 3/2007 | Trainin |
| 2007/0286122 | A1 | 12/2007 | Fonseca |
| 2008/0043649 | A1* | 2/2008 | Bhukania ............... H04J 3/0608 370/310 |
| 2008/0165715 | A1* | 7/2008 | Liu .................... H04W 52/0229 370/311 |
| 2013/0235737 | A1 | 9/2013 | Merlin et al. |
| 2014/0328270 | A1 | 11/2014 | Zhu et al. |
| 2015/0124744 | A1 | 5/2015 | Zhu et al. |

(Continued)

*Primary Examiner* — Christopher R Crompton
(74) *Attorney, Agent, or Firm* — WPAT, PC

(57) ABSTRACT

The present invention discloses a wireless communication method carried out by a wireless transmitter capable of offering an unintended wireless device a chance of starting or proceeding with a transmission procedure during a transmission duration of the wireless transmitter. An embodiment of said wireless communication method comprises the following steps: preparing a packet carrying an indication of a clear channel assessment (CCA) threshold level for an unintended wireless device to decide whether to execute a transmission procedure; and transmitting the packet to an intended wireless device under a protocol by which the unintended wireless device is expected to abide.

13 Claims, 13 Drawing Sheets

(56) References Cited

U.S. PATENT DOCUMENTS

2015/0163824 A1 6/2015 Krzymien et al.
2016/0374092 A1* 12/2016 Gao .................. H04W 72/0486

* cited by examiner

WIRELESS COMMUNICATION METHOD AND DEVICE

BACKGROUND OF THE INVENTION

1. Field of the Invention

The present invention relates to a wireless communication method and device, especially to a wireless communication method and device capable of improving network throughput.

2. Description of Related Art

Generally speaking, a wireless communication device transmits a packet through a certain frequency channel among one or more prescribed frequency channels. During its transmission, if another device transmits a packet through the same channel, the packets from the two devices will interfere with each other and one or both of the transmissions would probably fail. This interference is called packet collision.

In order to prevent packet collision, a Carrier Sense Multiple Access (CSMA) protocol such as the Carrier Sense Multiple Access with Collision Avoidance (CSMA/CA) is adopted. Take a contention-based system (e.g. a system conforming to a IEEE 802.11 standard) in compliance with the CSMA protocol for example; once a wireless communication device wins a transmission opportunity under the protocol and starts its transmission, any other device running after the same transmission opportunity has to hold off its transmission procedure for the duration indicated by a signal from the winner device, so that a potential collision could be avoided.

However, if the wireless communication device suspends its transmission procedure according to a signal whose strength is too low to make any interference, such suspension will do nothing good but cause a waste of network throughput. Therefore, a threshold for determining whether the suspension is necessary is used. More specifically, in a wireless network based on said CSMA protocol, a wireless communication device (hereafter, concerned device) which shares the same frequency channel with other devices will listen to signals from the other devices in the channel. Upon receiving a signal, the concerned device will measure the strength of the signal and compare it to a predetermined threshold (i.e. Clear Channel Assessment Threshold, CCA threshold) defined by the protocol. If the strength (hereafter, CCA level) of the signal falls below the CCA threshold, the signal could be treated as noise or something negligible; meanwhile, the concerned device may act as though the channel is clear, and either transmit or carry out other appropriate steps that are permitted to it. On the contrary, if the CCA level of the received signal is above the CCA threshold, this signal should be taken valid; in the meantime, the concerned device is required to treat the channel as it is occupied by a valid signal according to the protocol, and may not transmit for the duration indicated by the received signal.

Through the above-mentioned way, the protocol provides some assurance that valid signals will not collide with each other at levels which would cause unsuccessful transmission. Signals that are detected at a strength level higher than a prescribed threshold should be given precedence, so that these signals can be sent to their destination(s) without interference. On the other hand, signals that are detected at a strength level lower than the prescribed threshold could be ignored because these may be noise or signals from devices that are too far to make interference or get interference; in this case, even though a receiving device discovers signals and still transmits, its transmission may not appreciably interfere with the precedent transmission.

Please note that each device conforming to the CSMA protocol has to decide its own CCA threshold in light of the protocol (in other words, in pre-existing standards the value of a CCA threshold is usually defined by the protocol), and the value chosen for a CCA threshold may greatly affect overall network throughput. For some configuration of devices and the environment where they stay, a high CCA threshold applied to one or more devices may lead to a higher aggregate network data rate if multiple transmissions can therefore be carried out simultaneously and successfully. However, for some other configuration of devices and the environment they stay in, a high CCA threshold applied to one or more devices may cause a worse aggregate network data rate if multiple transmissions can be carried out simultaneously but most or all of them fails due to interference (i.e. packet collision); in this case, a low CCA threshold would be a better choice instead.

In light of the above, high (i.e. loose) CCA thresholds may increase overall system throughput significantly in moderately crowded environments because devices do not need to defer for precedent transmissions that may belong to a neighboring network. On the contrary, low (i.e. strict) CCA thresholds provide the stronger level of protection for individual transmissions, and minimize the probability of packet loss due to co-channel interference. Hence, there is a tradeoff: an overstrict CCA threshold prevents waiting devices from transmitting concurrently even when these concurrent transmissions would be successful and cause no failure to other transmissions, while an over loose CCA threshold allows too many devices to transmit simultaneously, which possibly causes all transmissions to fail.

Please also note that whether a permitted transmission (i.e. transmission in light of said transmission opportunity) is successful is dependent on the intended receiver (i.e. destination receiver); but whether a concurrent transmission could be carried out is determined by the result of an unintended receiver comparing the signal strength of the permitted transmission with its CCA threshold. Since the transmitter of the permitted transmission and the intended receiver are two distinct devices, a confusion may arise when the unintended receiver found that its concurrent transmission is allowed in accordance with the signal strength of the transmitter but had no idea whether this concurrent transmission will be harmful to the intended receiver. For instance, as shown in FIG. 1, a device 110 transmits packets to a device 120 while a device 130 plans to send packets to a device 140. If an attenuating obstacle 150 stands between devices 110 and 130 but outside the signal paths between devices 120 and 130 and devices 140 and 130, device 130 may find the signal strength of the packet from the device 110 low enough (i.e. below the CCA threshold of device 130) due to the attenuating obstacle 150 existence and then start transmitting packets to device 140; in the meantime, device 110 keeps sending packets to device 120, but the reception at device 120 and device 140 will be interfered by the transmission from device 130 and device 110 respectively because of the absence of any attenuating obstacle. In brief, under the current CSMA protocol, what is available to device 130 is the interference level caused by device 110 at device 130. In essence what is important to device 130 is the measure correlated with successful transmission.

Another problem of the current CCA mechanism is that an over loose CCA threshold may allow new transmission to succeed, but cause the already on-air transmission to fail.

This problem is potentially more serious, as the offending device (with the over loose CCA threshold) may not suffer its own packet loss, and thus lack an immediate feedback which could help change its behavior. This monopoly-like behavior may cause severe fairness problems because the suffering devices continually lose packets due to interference from the offending device but have no ways to communicate that fact to the offending device.

In summary, how to appropriately adjust the CCA threshold of a wireless network device, to enhance the total throughput of the network it belongs to, is a topic of great importance to the wireless networking industry.

SUMMARY OF THE INVENTION

In consideration of the problems of the prior art, an object of the present invention is to provide a wireless communication device and method capable of increasing overall network throughput.

Another object of the present invention is to provide a wireless communication device and method capable of informing unintended devices of a clear channel assessment (CCA) threshold level.

A further object of the present invention is to provide a wireless communication device and method capable of adjusting a CCA threshold level adaptively.

The present invention discloses a wireless communication method carried out by a wireless transmitter capable of offering an unintended wireless device a chance of starting or proceeding with a transmission procedure during a transmission duration of the wireless transmitter. An embodiment of said wireless communication method comprises the following steps: preparing a packet carrying an indication of a CCA threshold level for an unintended wireless device to decide whether to execute a transmission procedure; and transmitting the packet to an intended wireless device under a protocol to which the unintended wireless device is expected to conform.

The present invention discloses another wireless communication method carried out by a wireless transmitter capable of adjusting a CCA parameter. An embodiment of this wireless communication method comprises the following steps: receiving a signal from an intended wireless device; obtaining the quality information of an early transmission according to the signal; and adjusting a CCA parameter according to the quality information.

The present invention also discloses a wireless communication method carried out by a wireless receiver capable of employing an indication of a CCA threshold level in a packet. An embodiment of the wireless communication method comprises the following steps: receiving a packet carrying an indication of a CCA threshold level; reading the indication of the CCA threshold level from a header of the packet; calculating a CCA level according to a preamble of the packet; comparing the CCA level with a CCA threshold of the wireless receiver; and if the CCA level reaches the CCA threshold, executing a decision procedure according to the indication of the CCA threshold level.

Besides, the present invention discloses a wireless communication device capable of offering an unintended wireless device a chance of starting or proceeding with a transmission procedure during a transmission duration of the wireless communication device. An embodiment of said wireless communication device comprises: a CCA threshold level setting circuit operable to provide a CCA threshold level; a packet generating circuit operable to generate a packet according to the CCA threshold level in which the destination address of the packet is different from the address of an unintended wireless device; and a transmitting circuit operable to transmit the packet to an intended wireless device when winning a transmission opportunity under a protocol to which the unintended wireless device is expected to conform.

The present invention further discloses a wireless communication device capable of employing an indication of a CCA threshold level in a packet. An embodiment of the wireless communication device comprises: a receiving circuit operable to receive a packet carrying an indication of a CCA threshold level; a packet processing circuit operable to read the indication of the CCA threshold level from the packet; and a CCA decision circuit operable to calculate a CCA level according to the packet, compare the CCA level with a CCA threshold of the wireless communication device, and execute a decision procedure according to the indication of the CCA threshold level if the CCA level reaches the CCA threshold.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 3b illustrates a wireless communication method of the present invention based on the method of FIG. 3a.

FIG. 6b illustrates a wireless communication method of the present invention based on the method of FIG. 6a.

FIG. 7b illustrates an embodiment of the packet generating circuit of FIG. 7a.

FIG. 8b illustrates an embodiment of the packet processing circuit of FIG. 8a.

FIG. 8c illustrates an embodiment of the CCA decision circuit of FIG. 8a.

DETAILED DESCRIPTION OF THE PREFERRED EMBODIMENTS

The following description is written by referring to terms of this invention field. If any term is defined in the specification, such term should be explained accordingly. Besides, the connection between objects or events in the disclosed embodiments can be direct or indirect provided that these embodiments are still applicable under such connection. Said "indirect" means that an intermediate object or a physical space is existed between the objects, or an intermediate event or a time interval is existed between the events. In addition, the following description relates to wireless communication technology, and the common knowledge known in this field will be omitted if such knowledge has little to do with the features of the present invention. Furthermore, the shape, size, and ratio of any element and the step sequence of any flow chart in the disclosed figures are just exemplary for understanding, not for limiting the scope of this invention.

In the following description, each embodiment includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

The present invention discloses wireless communication methods and devices capable of improving network throughput. These methods and devices are applicable to devices following a standard (e.g. IEEE 802.11 standard(s) including IEEE 802.11ax standard) abiding by a Carrier Sense Multiple Access (CSMA) protocol such as a Carrier Sense Multiple Access with Collision Avoidance (CSMA/CA) protocol or the like; however, these applications are not limitations to the present invention, just for understanding. People of ordinary skill in the art can choose components or steps equivalent to those described in this specification to carry out the present invention, which means that the scope of this invention is not limited to the embodiments in the specification. Said wireless communication methods can be in the form of firmware and/or software which could be carried out by the wireless communication devices of this invention or the equivalent thereof; therefore, the following description will abridge the hardware details for executing the methods but put the emphasis on the steps. Besides, on account of that some or all elements of said wireless communication devices could be known, the detail of such elements will be omitted provided that this omission nowhere dissatisfies the specification and enablement requirements.

Figure 1:
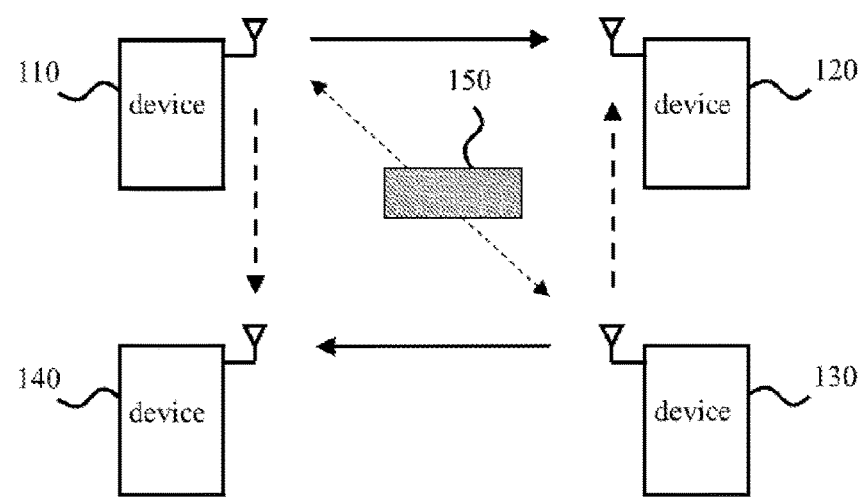
FIG. 1 illustrates a wireless network configuration with an attenuating obstacle.
Figure 2:
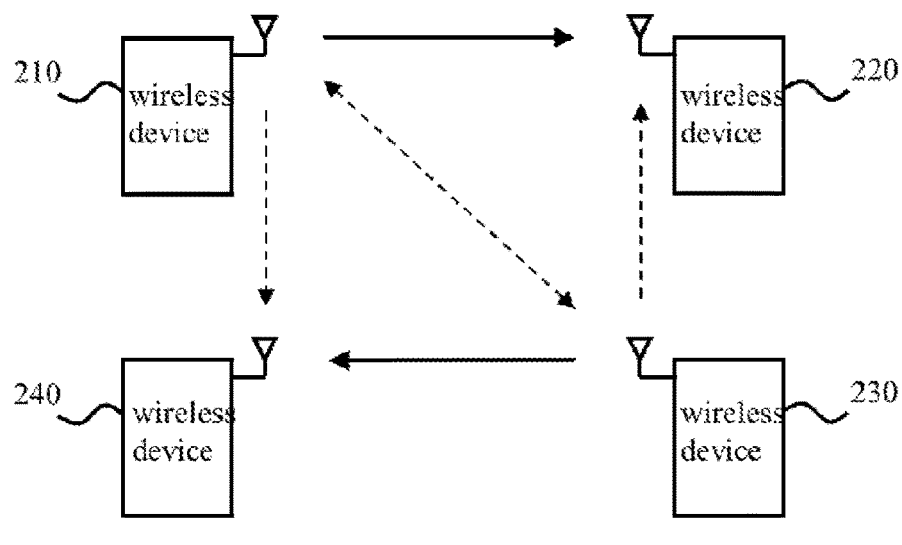
FIG. 2 illustrates a wireless network configuration capable of functioning as a system carrying out all aspects of the present invention.

Before discussing each individual embodiment of the present invention, please refer to FIG. 2 which illustrates a wireless network configuration 200 capable of functioning as a system carrying out all aspects of the present invention. The network configuration 200 includes: a wireless communication device 210 acting as a transmitter capable of transmitting a packet in compliance with the present invention; a wireless communication device 220 acting as an intended receiver capable of receiving and identifying the packet from the transmitter 210; and a wireless communication device 230 acting as an unintended receiver capable of receiving and identifying the packet from the transmitter 210, in which the packet is addressed to the intended receiver 220 while the unintended receiver 230 might plan to transmit a signal to another wireless communication device 240 (which also acts as an unintended receiver to the transmitter 210) before receiving the packet. In this network configuration 200, each of the devices 210, 220, 230, 240 is able to determine a clear channel assessment (CCA) level according to the strength of the signal it received, and has its own CCA threshold for distinguishing a valid signal from an invalid signal in cooperation with the CCA level. Accordingly, in order to make the channel assessment more efficient and appropriate for network throughput improvement, the present invention provides the solutions as follows.

Figure 3A:
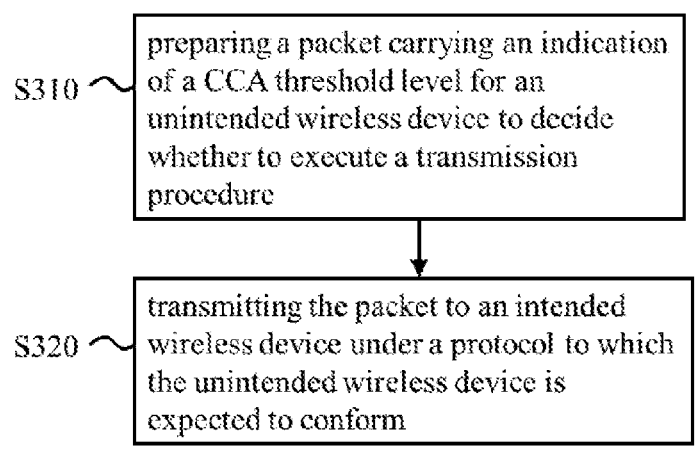
FIG. 3a illustrates a wireless communication method of the present invention carried out by a wireless transmitter.
Figure 4:
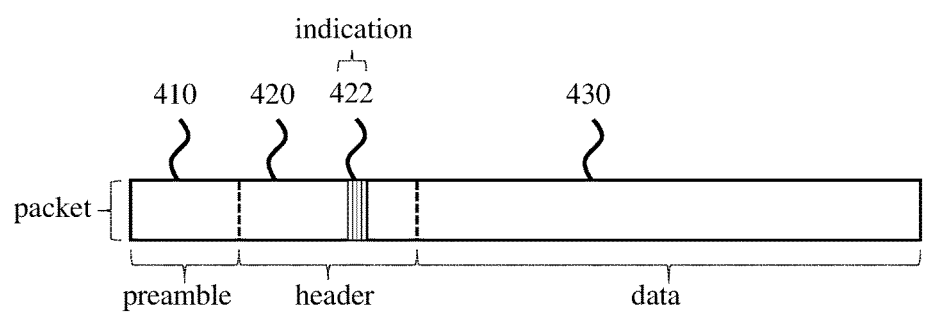
FIG. 4 illustrates a packet carrying an indication of a CCA threshold level according to the present invention.

Please refer to FIG. 3a which illustrates an embodiment of a wireless communication method of the present invention. This embodiment is carried out by a wireless transmitter (e.g. device 210 of FIG. 2) capable of offering an unintended wireless device (e.g. device 230 of FIG. 2) a chance of starting or proceeding with a transmission procedure during a transmission duration of the wireless transmitter, comprising the following steps:

Step S310: preparing a packet carrying an indication of a CCA threshold level for the unintended wireless device to decide whether to execute the transmission procedure. An embodiment of the packet is shown in FIG. 4 where the packet 400 includes a preamble 410, a header 420 and data 430, and the indication 422 is included in the header 420 in the form of one or several bits (e.g. 2 bits for indicating one among four CCA level thresholds). This indication 422 may be associated with the CCA threshold level directly or an increment or decrement of the CCA threshold level, and could indicate the lowest or some default CCA threshold level at the very beginning. Besides, the CCA threshold level could be the same as, proportional to or independent of the CCA threshold of the wireless transmitter; furthermore, the destination address of the packet is not the address of the unintended receiver.

Step S320: transmitting the packet to an intended wireless device (e.g. device 220 of FIG. 2) under a protocol to which the unintended wireless device is expected to conform. In this embodiment, step S320 is executed when the wireless transmitter wins a transmission opportunity under the protocol which indicates that the unintended wireless device running after the same transmission opportunity has to hold off its transmission procedure if it finds that the channel in connection with the transmission opportunity is not clear. The protocol here is a CSMA protocol, and the wireless transmitter, the unintended wireless device and the intended wireless device support the same. More specifically, this embodiment is applicable to an IEEE 802.11 standard (e.g. 802.11ax standard) in compliance with the CSMA protocol and the devices abide by the same.

In light of the above, the unintended wireless device is a potential receiver capable of receiving and identifying the packet from the wireless transmitter. If this unintended wireless device actually exists, although the packet is not addressed to it, the unintended wireless device is still allowed to start or carry on its transmission procedure if the signal strength of the packet is below the CCA threshold level mentioned in the indication of the packet, or else required to hold off the transmission procedure if the signal strength of the packet is above the CCA threshold level. In the meantime, the intended wireless device is an actually existing one, and capable of receiving and identifying the packet from the wireless transmitter. Since the packet is addressed to the intended wireless device, there is no room for it to start or proceed with a concurrent transmission during reception, which means that the intended wireless device will do nothing in response to the CCA indication. Please note that the wireless transmitter and the intended wireless device should belong to the same basic service set (BSS) while the unintended wireless device could belong to the same or a different BSS.

In view of that some intended wireless device can tolerate higher interference but some can't, and some standard under the aforementioned protocol might introduce a floor (or a lower floor in comparison with some other standards) to the packet error rate, before executing step S320, the present embodiment may determine the CCA threshold level in advance according to at least one of the type, destination address, priority attribute and queue of the packet or its subsequent packet and/or according to a standard of the protocol with which the packet or its subsequent packet comply. For instance, if the intended wireless device is going to play a video stream according to the packet and/or its subsequent packet, the present embodiment may set the CCA threshold level strict, so as to avoid interference. More specifically, the purpose of the packet or its subsequent packet could be known through its packet type, destination address, priority attribute or the queue it stays, and the CCA threshold level could be set accordingly.

Figure 3B:
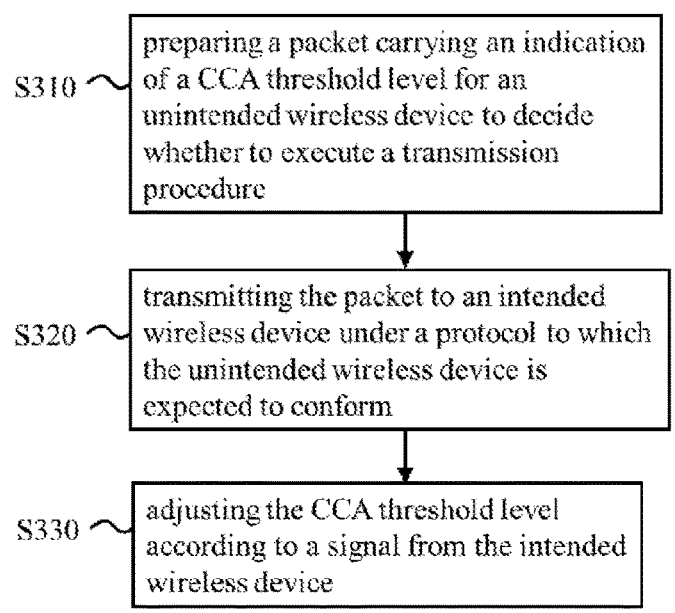

After successfully receiving one or more packets such as the packet prepared by step S310 or some packet prior to it from the wireless transmitter, the intended wireless device will send a signal (e.g. one ore more acknowledgements, or a control frame indicating a signal-to-interference (SIR) ratio or the like) to the wireless transmitter to let it know the arrival of said packet(s) or tell it the reception condition of the intended wireless device. Consequently, as shown in FIG. 3b, the present embodiment may further comprise the following step to make use of this feedback signal:

Step S330: adjusting the CCA threshold level according to the signal, so as to make it more suitable for the current network configuration and environment.

For instance, if the signal from the intended wireless device represents one or more acknowledgements, step S330 may be realized through the following steps (not shown in the figures):

Step S332: counting a number of the one or more acknowledgements from the intended wireless device.

Step S334: comparing the number with a predetermined acknowledgement number and thereby generating a comparison result.

Step S336: adjusting the CCA threshold level according to the comparison result. In this embodiment, if the comparison result indicates that the number reaches the predetermined acknowledgement number, which means that the successfully transmitted packets has accumulated to a predetermined amount, step S336 then raises the CCA threshold level.

For another instance, if the signal from the intended wireless device still represents one or more acknowledgements, step S330 may be realized through the following step (not shown in the figures):

Step S338: lowering the CCA threshold level if the increment of a number of the one or more acknowledgements comes to a halt and a retry ratio of packet transmission, which is determined by the wireless transmitter, satisfies a predetermined retry ratio. In other words, if the wireless transmitter found that a packet transmission has failed based on the fact that it received no expected acknowledgement, which implies that the CCA threshold level the wireless transmitter issued before might be too high (i.e. loose) and make some unintended wireless device cause interference to the intended wireless device, the CCA threshold level should be reduced accordingly.

For a further instance, if the signal from the intended wireless device includes a control frame indicating the SIR ratio or something similar, step S330 may adjust the CCA threshold level according to the SIR ratio or take the SIR ratio as a parameter for adjusting the CCA threshold level. Other parameters that could be used in step S330 for the adjustment to the CCA threshold level include: a retry ratio of packet transmission determined by the wireless transmitter, a rate of successful transmission determined by the wireless transmitter, and etc.

Please note that after adjusting the CCA threshold level, the accumulated number could be reset to zero or some similar step could be taken for the next round of doing statistics.

Now the wireless transmitter has given out its willingness to allow concurrent transmission, it is fair for the wireless transmitter to get itself higher throughput or at least equitable throughput in reward. Therefore, the present embodiment further comprises the following step (not shown in the figures):

Step S340: adjusting a number or a value range of a backoff counter of the wireless transmitter if the CCA threshold level is adjusted, wherein the protocol is a contention-based protocol. For example, the number or the value range would be decreased with an ascending CCA threshold level or increased with a descending CCA threshold level, so that the influence of concurrent transmission could be balanced off.

Figure 5:
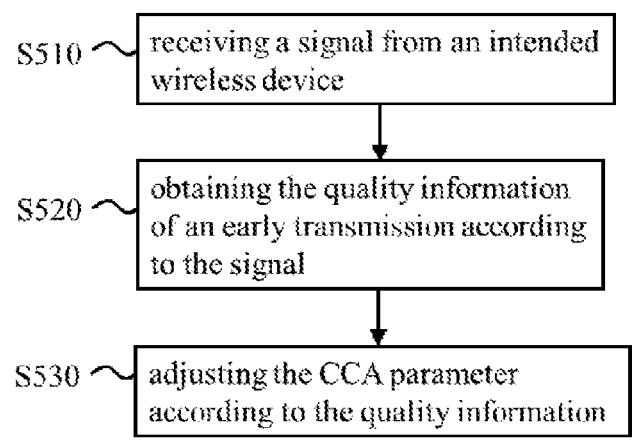
FIG. 5 illustrates another wireless communication method of the present invention carried out by a wireless transmitter.

In addition to the above-disclosed method, the present invention also discloses a wireless communication method carried out by a wireless transmitter (e.g. device 210 of FIG. 2) capable of adjusting a CCA parameter. Compared to the aforementioned one, this method doesn't require the step of sending a packet carrying the CCA threshold level must. An embodiment of the method is shown in FIG. 5, comprising:

Step S510: receiving a signal from an intended wireless device (e.g. device 220 of FIG. 2). Said signal, for example, could be one or more acknowledgements or a control frame carrying SIR information or the like.

Step S520: obtaining the quality information of early transmission(s) according to the signal. Said quality information, for example, could be the statistic of the acknowledgement(s) or the SIR or the derived value thereof.

Step S530: adjusting the CCA parameter according to the quality information. Said CCA parameter could be the aforementioned CCA threshold level or its equivalent.

Of course, after adjusting the CCA parameter, the present embodiment may execute the following step to make use of the adjusted CCA parameter:

Step S540: transmitting a packet carrying an indication of the CCA parameter which offers an unintended wireless device a chance of starting or proceeding with a transmission procedure during a transmission duration of the wireless transmitter, wherein the destination address of the packet is different from the address of the unintended wireless device. In this embodiment, the packet includes a preamble, a header and data, and the indication is included in the header; moreover, the length of said header is longer than the header length abiding by IEEE 802.11n standard but equal to the header length abiding by IEEE 802.11ax standard.

Since people of ordinary skill in the art can fully understand the current embodiment and the modifications thereto by referring to FIG. 2 to FIG. 4 and the descriptions thereof, repeated and redundant explanation is therefore omitted provided that the remaining description is still sufficient for understanding and enablement. In fact, all the modifications applicable to the previous embodiments are also applicable here.

Figure 6A:
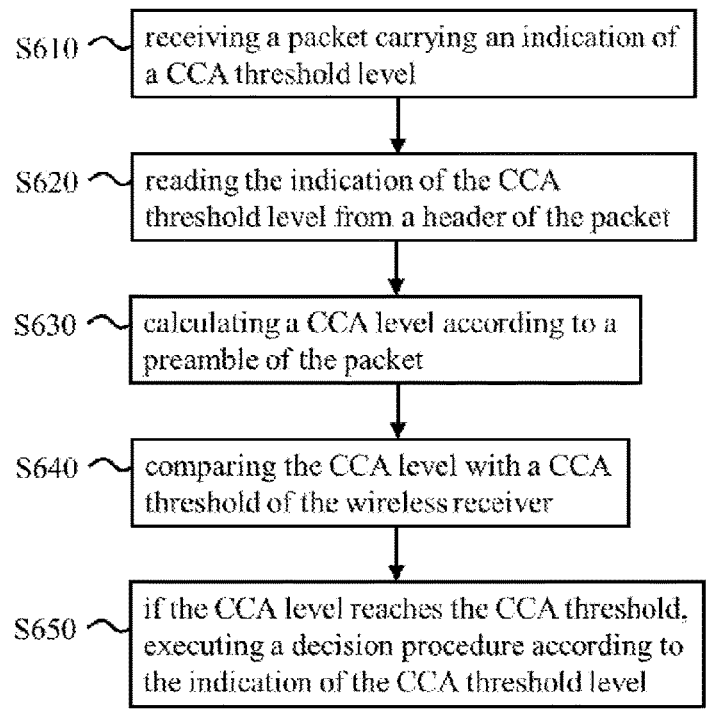
FIG. 6a illustrates a wireless communication method of the present invention carried out by a wireless receiver.

Turn to the reception end. The present invention further discloses a wireless communication method carried out by a wireless receiver (e.g. device 230 of FIG. 2) capable of employing an indication of a CCA threshold level in a packet. This method is applicable to an IEEE 802.11 standard (e.g. IEEE 802.11ax standard) conforming to the aforementioned CSMA protocol. An embodiment of the method is shown in FIG. 6a, comprising:

Step S610: receiving the packet carrying the indication of the CCA threshold level. An example of the packet is the packet 400 of FIG. 4.

Step S620: reading the indication of the CCA threshold level from a header of the packet.

Step S630: calculating a CCA level according to a preamble of the packet. Said CCA level in this embodiment is derived from the signal strength of the preamble.

Step S640: comparing the CCA level with a CCA threshold of the wireless receiver. Said CCA threshold is set by the wireless receiver itself according to the protocol it relies on.

Step S650: if the CCA level reaches the CCA threshold, executing a decision procedure according to the indication of the CCA threshold level. More specifically, once the CCA level reaches the CCA threshold, said packet will be deemed a valid signal instead of noise or something negligible; consequently, the decision procedure will be taken to process the packet even though this packet is not addressed to the wireless receiver.

Figure 6B:
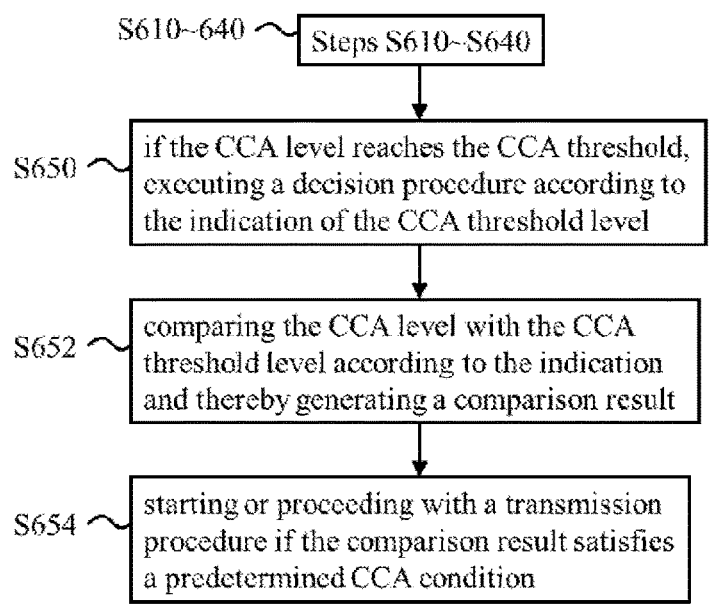

In this embodiment, the decision procedure includes the following steps as shown in FIG. 6b:

Step S652: comparing the CCA level with the CCA threshold level according to the indication and thereby generating a comparison result.

Step S654: starting or proceeding with a transmission procedure if the comparison result satisfies a predetermined CCA condition. For instance, the predetermined CCA condition indicates that the CCA level is below the CCA threshold level.

In light of the above, there is a possibility that the CCA threshold level prescribed by the packet conflicts with the CCA threshold of the wireless receiver. More specifically, a contradiction will happen when the CCA threshold level of the packet says that it's safe for concurrent transmission while the CCA threshold of the wireless receiver doesn't think so, or the CCA threshold level disagrees on current transmission while the CCA threshold finds it acceptable. In order to prevent such contradiction, the present embodiment has the CCA threshold level of the packet dominant in comparison with the CCA threshold of the wireless receiver; however, in an alternative embodiment, the CCA threshold of the wireless receiver will prevail, so that the wireless receiver can make its own discretion.

Similarly, since those of ordinary skill in the art can fully understand the current embodiment and the modifications thereto by referring to FIG. 2 to FIG. 5 and the descriptions thereof, repeated and redundant explanation is therefore omitted.

Figure 7A:
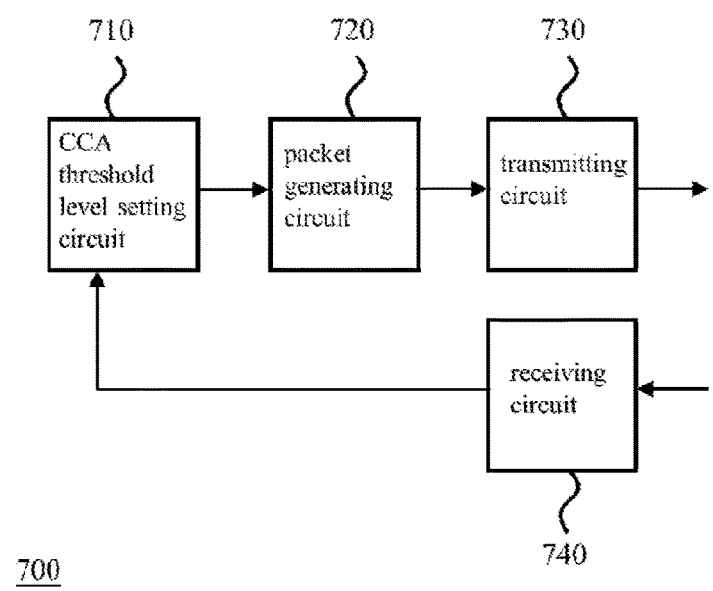
FIG. 7a illustrates a wireless communication device of the present invention capable of executing the methods of FIGS. 3 and 5.
Figure 7B:
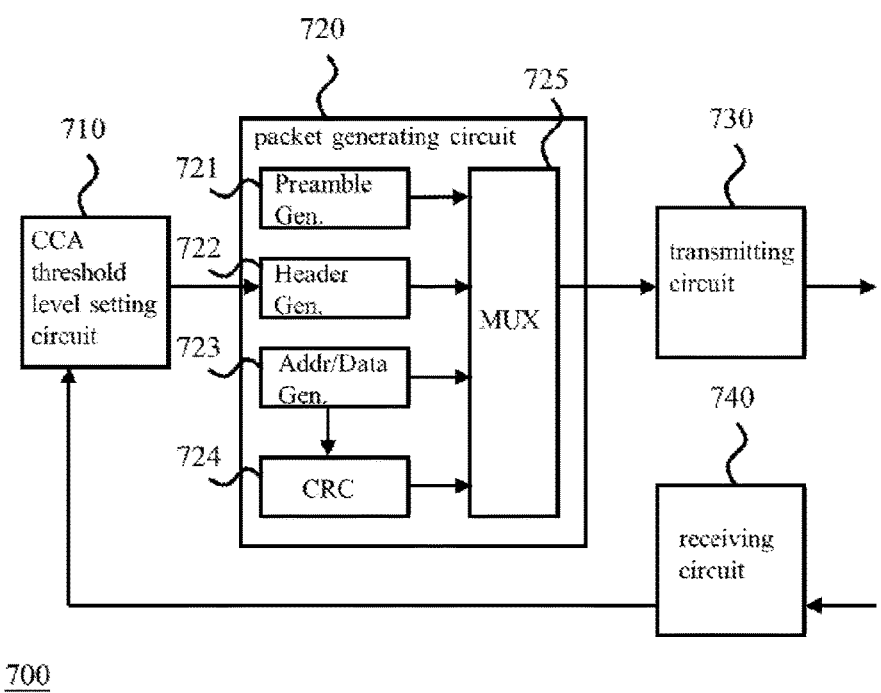

Please refer to FIG. 7a which illustrates a wireless communication device 700 (e.g. device 210 of FIG. 2) of the present invention capable of executing the methods of FIGS. 3a, 3b and 5 to thereby offer an unintended wireless device (e.g. device 230 of FIG. 2) a chance of starting or proceeding with a transmission procedure during a transmission duration of the wireless communication device 700. This wireless communication device 700 comprises: a CCA threshold level setting circuit 710; a packet generating circuit 720; and a transmitting circuit 730. Said CCA threshold level setting circuit 710 is operable to provide a CCA threshold level which might be a default level or a level derived from it according to some transmission quality information. Said packet generating circuit 720 is operable to generate a packet according to the CCA threshold level in which the destination address of the packet is different from the address of the above-mentioned unintended wireless device. Please refer to FIG. 7b; an embodiment of the packet generating circuit 720 includes: a preamble generating unit 721 (Preamble Gen.) operable to generate a preamble of the packet; a header generating unit 722 (Header Gen.), coupled with the CCA threshold level setting circuit 710, operable to generate a header of the packet including the CCA threshold level; an address and data generating unit 723 (Addr/Data Gen.) operable to generate a destination address (i.e. the address of an intended wireless device) and data of the packet; a Cyclic Redundancy Check unit 724 (CRC), coupled with the address and data generating unit 723, operable to generate a CRC code of the packet according to the data; and a multiplexer 725 (MUX) operable to produce the packet according to the preamble, the header, the destination address, the data and the CRC code and then output it to the transmitting circuit 730. Finally, said transmitting circuit 730 is operable to transmit the packet to the intended wireless device when winning a transmission opportunity under a protocol (e.g. a CSMA protocol adopting the present invention) by which the unintended wireless device is expected to abide.

Please refer to FIG. 7a again. In order to make the CCA threshold level more appropriate, the wireless communication device 700 may further comprise: a receiving circuit 740 operable to receive a signal from the intended wireless device, wherein the CCA threshold level setting circuit 710 is operable to adjust the CCA threshold level according to the signal. For instance, the CCA threshold level setting circuit 710 includes: a counter operable to count a number of one or more acknowledgements according to the signal; and a regulator operable to adjust the CCA threshold level according to the number. This CCA threshold level setting circuit 710 may further include: a controller operable to reset the accumulated number of the counter after the CCA threshold level has been adjusted. Moreover, in order to compensate the throughput of the wireless communication device, the CCA threshold level setting circuit 710 may be further operable to adjust a number or a value range of a backoff counter of the wireless communication device.

Figure 8A:
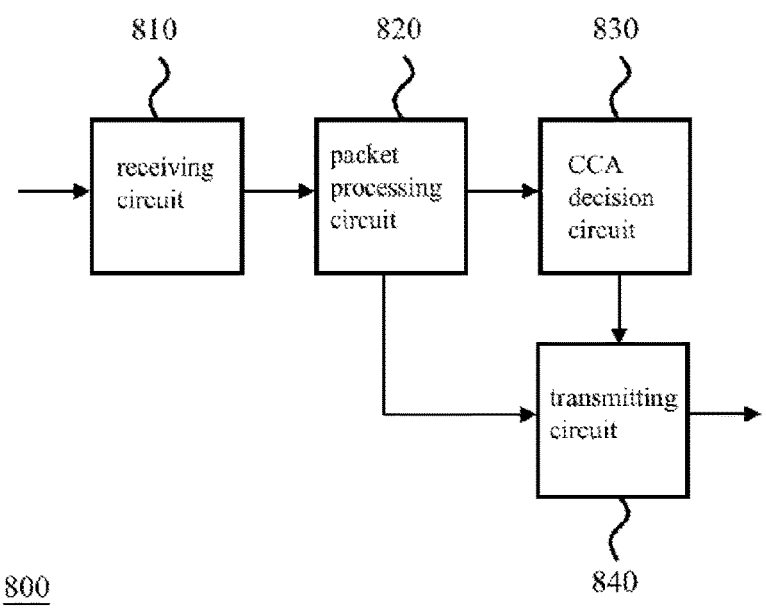
FIG. 8a illustrates a wireless communication device of the present invention capable of executing the method of FIG. 4.
Figure 8B:
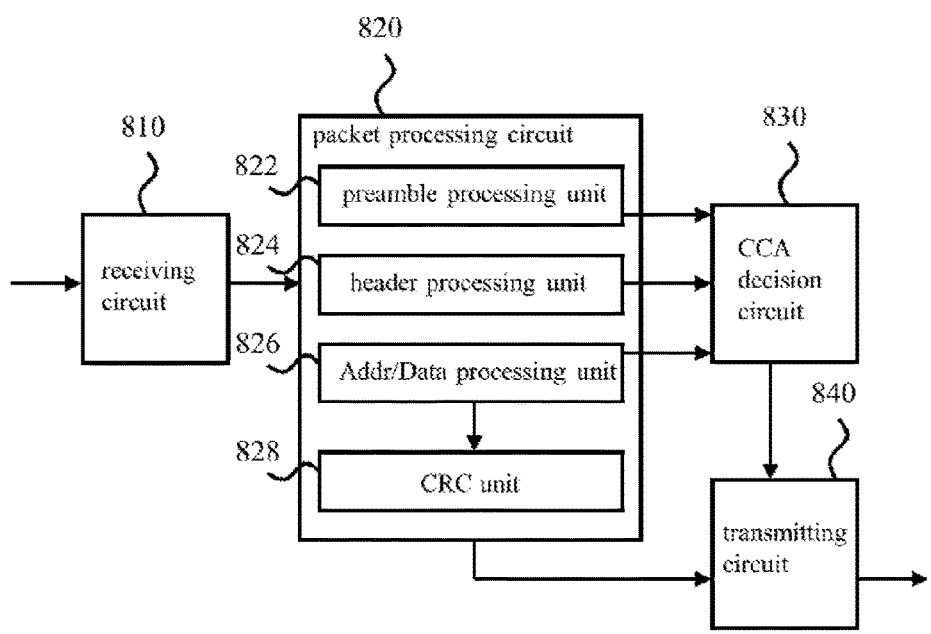
Figure 8C:
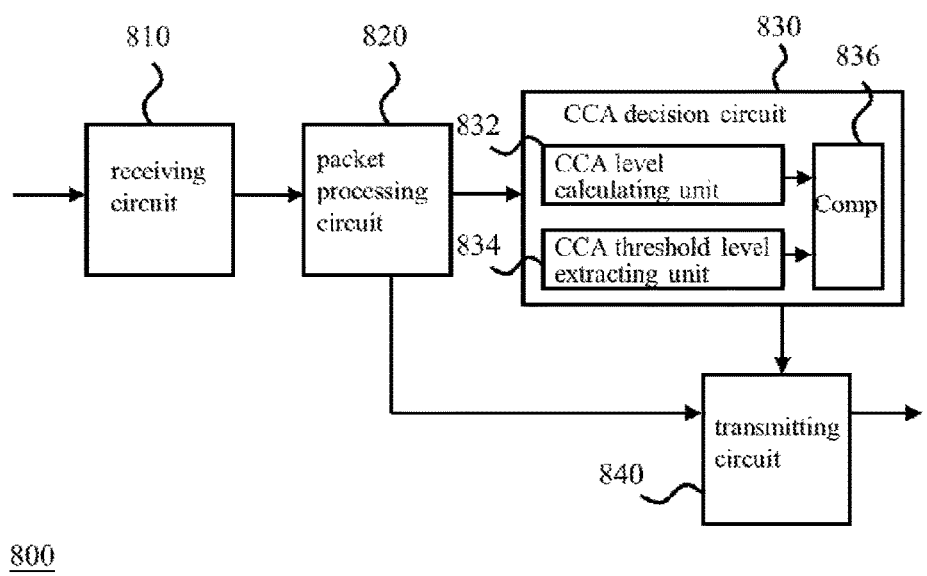

Please refer to FIG. 8a which illustrates a wireless communication device 800 (e.g. device 230 of FIG. 2) of the present invention capable of executing the method of FIGS. 6a and 6b to consequently employ an indication of a CCA threshold level in a packet. This wireless communication device 800 comprises: a receiving circuit 810; a packet processing circuit 820; and a CCA decision circuit 830. Said receiving circuit 810 is operable to receive the packet carrying the indication of the CCA threshold level such as that transmitted by the wireless communication device 700 of FIG. 7a. Said packet processing circuit 820 is operable to read the indication of the CCA threshold level from the packet. Please refer to FIG. 8b; an embodiment of the packet processing circuit 820 includes: a preamble processing unit 822 operable to extract the preamble of the packet; a header processing unit 824 operable to extract the header of the packet; an address and data processing unit 826 (Addr/Data processing unit) operable to extract the destination address of the packet; and a CRC unit 828 operable to verify the CRC code of the packet according to the data from the address and data processing unit 826. Besides, said CCA decision circuit 830 is operable to calculate a CCA level according to the packet, compare the CCA level with a CCA threshold of the wireless communication device 800, and execute a decision procedure according to the indication of the CCA threshold level if the CCA level reaches the CCA threshold. More specifically, as shown in FIG. 8c, the CCA decision circuit 830 may include: a CCA level calculating unit 832 for calculating the CCA level according to the signal strength of the preamble from the preamble processing unit 821; a CCA threshold level extracting unit 834 for extracting the indication of the header from the header processing unit 822; and a comparison unit 836 (Comp) for comparing the CCA level with the CCA threshold of the device 800 and then executing the decision procedure according to the indication if the CCA level reaches the CCA threshold.

In the present embodiment, the decision procedure includes: comparing the destination address of the packet from the address and data processing unit 826 with the address (e.g. medium access control (MAC) address) of the wireless communication device 800; if the destination address of the packet is the same as the address of the device 800, replying the device (e.g. device 210 of FIG. 2) who sent the packet with an acknowledgement by a transmitting circuit 840; if the destination address of the packet is different from the address of the device 800, which makes the device 800 an unintended receiver, comparing the calculated CCA level with the CCA threshold level of the packet to thereby generate a comparison result; and allowing the transmitting circuit 840 to start or proceed with a transmission procedure if the comparison result satisfies a predetermined CCA condition (e.g. the CCA level lower than the CCA threshold level).

Similarly, since those of ordinary skill in the art can appreciate the full figure of the current embodiment and the modifications thereto by referring to the fore-disclosed embodiments, repeated and redundant explanation is therefore omitted.

The follows are the generalization/derivations of the present invention. The embodiments described above are able to cover many more cases and more general applicability:

(1) Extension to multiple categories of CCA threshold: The "legacy" protocol may define multiple fixed CCA threshold levels for different situations, rather than a single level. For example, the IEEE 802.11ac protocol defines different CCA threshold levels according to the bandwidth of the received signal (20 MHz, 40 MHz, 80 MHz, or 160 MHz). The present invention may be adapted to this case by defining the signaled level to be the offset from the CCA threshold level that would otherwise apply; or by maintaining a different counter and a CCA threshold level for each possible transmitted bandwidth.

(2) Extension to different traffic categories: The present invention may be adapted to provide different levels of protection for different data traffic categories. For example some traffic may be delay-sensitive, requiring minimal retransmissions, while other traffic may tolerate delay relatively well. The present invention may be adapted to this case by maintaining a different counter and CCA threshold level for each such category, by defining different predetermined acknowledgement numbers for each such category (higher numbers for more delay-sensitive traffic, allowing more packets to be transmitted at a given protection level before having to loosen), by defining a different set of allowable candidate CCA threshold levels for each such category (with generally lower levels for each such category) or any combination of these.

(3) Other extensions: In the illustrative preferred embodiments, there was a single predetermined acknowledgement number that defined how many packets could be transmitted successfully before an increase (loosening) in the permitted signaled CCA threshold level was required. But there is no essential reason why this is required. The present invention may define a separate number for each CCA threshold level.

(4) Extension to Block Acknowledgements: In modern wireless local area networking systems, it is common for a series of transmitted packets to be sent without individual acknowledgements for each packet before the next is transmitted, but rather with a single "Block Acknowledgement" later. This block acknowledgement lists which packets in the sequence were received successfully and which not. The present invention may be adapted to this case by defining any appropriate measure of "satisfactory" or "unsatisfactory" response based on the success level indicated by the Block Acknowledgement. As an illustrative example, and without limitation, the present invention could define a success level of 90% or more of the transmitted packets received in the Block Acknowledgement as constituting a "satisfactory" level for purposes of adjustment of allowed CCA threshold level, and thus to be treated as the successful acknowledgment of a single packet would be treated, and conversely for a success level that fell below 90%.

(5) Extension to signal-to-interference ratio (SIR) feedback: As it is mentioned in the foregoing paragraphs, the transmitting device also can use the signal-to-interference ratio (SIR) measurement from the intend receiver to determine the acceptable CCA threshold levels in its own transmitted packets directly.

(6) Extension to Random Backoff Adjustment: As it is mentioned in the foregoing paragraphs, based on the CSMA protocol, the transmitting device also can be allowed to adjust the random backoff value with different CCA threshold level.

To sum up, the methods of the present invention can be deemed a new protocol or a modification based on a CSMA protocol, and the devices of the present invention are those capable of carrying out the methods. Through the present invention, a transmitter can notify receivers in the network (or the channel) it stays of a CCA threshold level to thereby offer the unintended receivers among the receivers a chance of carrying out concurrent transmission if a prescribed condition is verified. Furthermore, the transmitter can also modify said CCA threshold level in accordance with a feedback from an intended receiver before or after sending said notification. In this way each device may adapt its transmission to a protection level (i.e., its signaled CCA threshold level) that provides high reliability, but without permitting protection levels that are stricter than necessary, and thus without unnecessarily restricting other devices in the vicinity from transmitting. The present invention enables this, moreover, without requiring any details of the physical configuration of devices or of the local environment to be distributed among devices or even to be calculated by any device; however, this invention is open to adopting such information. In essence each device is enabled to find its natural required protection level (i.e., CCA threshold level) simply from the success or failure of transmissions, as measured by received acknowledgements.

The present invention adapts naturally to changes in the environment, howsoever caused, including changes due to mobility of the transmitting device or its intended receiver or of interfering devices, and changes due to change of state of any potentially interfering devices (enter sleep mode and stop transmitting, enter wake mode and start transmitting, and so on). The extra overhead required by the present invention is minimal; for instance, it requires just the use of a small number of signaling bits in each transmitted packet and a simple counter and a state machine or the like at each device to keep track of permitted CCA threshold levels.

As it is mentioned in the forgoing paragraphs, the present invention works without requiring each participating device to belong to the same network (i.e. BSS), thus avoiding the need for devices to perform association and authentication steps among each other: the exchange of information occurs at the lowest physical layer level. Besides, this invention accommodates the presence of "legacy" devices, i.e., devices that support the same underlying CSMA network protocol, but lack the capabilities of the present invention. Such legacy devices ignore the signaled CCA threshold level indication bit(s) sent by devices supporting the new protocol and instead use a fixed CCA threshold level defined by the underlying network protocol. Also any packet transmitted by such a legacy device may be treated by all devices implementing the new protocol as signaling the fixed CCA threshold defined by the underlying network protocol. In this way the present invention adds capabilities without degrading performance for any devices, legacy or new.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A wireless communication method carried out by a wireless receiver capable of employing a clear channel assessment (CCA) threshold level in a packet from a wireless transmitter, comprising:
   receiving the packet carrying the CCA threshold level;
   reading the CCA threshold level from a header of the packet, in which the CCA threshold level is included in the header of the packet and in a form of one or several bits;
   calculating a CCA level according to the packet;
   comparing the CCA level with a CCA threshold of the wireless receiver, in which the CCA threshold is set by the wireless receiver according to a protocol; and
   after the CCA level reaches the CCA threshold and the packet is deemed a valid signal, executing a decision procedure according to the CCA threshold level,
   wherein the decision procedure is operable to allow the wireless receiver to start or proceed with a transmission procedure during a transmission duration of the wireless transmitter.

2. The wireless communication method of claim 1, wherein the decision procedure includes:
   making a comparison according to the CCA level and the CCA threshold level, and thereby generating a comparison result; and
   starting or proceeding with the transmission procedure when the comparison result satisfies a predetermined CCA condition.

3. The wireless communication method of claim 2, wherein the predetermined CCA condition includes that the CCA level is below the CCA threshold level.

4. The wireless communication method of claim 1, wherein a destination address of the packet is different from an address of the wireless receiver.

5. The wireless communication method of claim 1, wherein the CCA threshold level prescribed by the packet is dominant in comparison with the CCA threshold of the wireless receiver.

6. The wireless communication method of claim 1, which is applicable to IEEE 802.11ax standard while a length of the header is longer than a header length conforming to IEEE 802.11n standard.

7. A wireless communication device capable of using a packet to offer an unintended wireless device a chance of starting or proceeding with a transmission procedure during a transmission duration of the wireless communication device, comprising:
   a clear channel assessment (CCA) threshold level setting circuit operable to provide a CCA threshold level according to at least one of the follows: a type of the packet or a type of another packet subsequent to the packet; a destination address of the packet or a destination address of the another packet; a priority attribute of the packet or a priority attribute of the another packet; and a queue of the packet or a queue of the another packet;
   a packet generating circuit operable to generate the packet including the CCA threshold level, in which the CCA threshold level is included in the packet and in a form of one or several bits, and the destination address of the packet is the same as an address of an intended wireless device but different from an address of the unintended wireless device; and
   a transmitting circuit operable to transmit the packet to the intended wireless device when winning a transmission opportunity under a protocol to which the unintended wireless device is expected to conform.

8. The wireless communication device of claim 7, further comprising:
   a receiving circuit operable to receive a signal from the intended wireless device,
   wherein the CCA threshold level setting circuit is operable to adjust the CCA threshold level according to the signal.

9. The wireless communication device of claim 8, wherein the CCA threshold level setting circuit includes:
   a counter operable to count a number of one or more acknowledgements according to the signal; and
   a regulator operable to adjust the CCA threshold level according to the number.

10. The wireless communication device of claim 7, wherein the CCA threshold level setting circuit is further operable to adjust a number or a value range of a backoff counter of the wireless communication device.

11. A wireless communication device capable of employing an indication of a clear channel assessment (CCA) threshold level in a packet, comprising:
   a receiving circuit operable to receive the packet carrying the indication of the CCA threshold level, in which the indication of the CCA threshold level is included in the packet and in a form of one or several bits;
   a packet processing circuit operable to read the indication of the CCA threshold level from the packet; and
   a CCA decision circuit operable to calculate a CCA level according to the packet, compare the CCA level with a CCA threshold of the wireless communication device, and execute a decision procedure according to the indication of the CCA threshold level, in which the CCA threshold is set by the wireless communication device according to a protocol;

wherein if the CCA threshold level of the packet is dominant in comparison with the CCA threshold of the wireless communication device, the decision procedure is operable to allow the wireless communication device to start or proceed with a transmission procedure according to the indication of the CCA threshold level carried by the packet even when the CCA threshold of the wireless communication device does not allow the transmission procedure.

12. The wireless communication device of claim 11, wherein the decision procedure includes:
   making a comparison according to the CCA level and the CCA threshold level to thereby generate a comparison result; and
   allowing a transmitting circuit of the wireless communication device to start or proceed with the transmission procedure if the comparison result satisfies a predetermined CCA condition.

13. The wireless communication device of claim 12, wherein the predetermined CCA condition includes that the CCA level is below the CCA threshold level.

* * * * *